US007001966B2

(12) United States Patent
Lang et al.

(10) Patent No.: US 7,001,966 B2
(45) Date of Patent: Feb. 21, 2006

(54) METHOD FOR THE PRODUCTION OF ISOBUTENE POLYMERS

(75) Inventors: Gabriele Lang, Mannheim (DE); Arno Lange, Bad Duerkheim (DE); Hans Peter Rath, Gruenstadt (DE); Helmut Mach, Heidelberg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 37 days.

(21) Appl. No.: 10/505,871

(22) PCT Filed: Feb. 27, 2003

(86) PCT No.: PCT/EP03/02038

§ 371 (c)(1),
(2), (4) Date: Sep. 2, 2004

(87) PCT Pub. No.: WO03/074577

PCT Pub. Date: Sep. 12, 2003

(65) Prior Publication Data

US 2005/0107551 A1  May 19, 2005

(30) Foreign Application Priority Data

Mar. 4, 2002 (DE) ............... 102 09 404
Jul. 16, 2002 (DE) ............... 102 32 157

(51) Int. Cl.
*C08F 110/10* (2006.01)
*C08F 8/00* (2006.01)

(52) U.S. Cl. .............. 526/348.7; 526/135; 526/147; 526/185; 526/193; 526/194; 526/209; 526/214; 526/237; 526/189; 525/106; 525/270; 525/288; 525/313; 525/333.7; 525/334.1; 525/343; 525/355; 525/918

(58) Field of Classification Search ............. 526/348.7, 526/237, 135, 147, 185, 189, 193, 194, 209, 526/214; 525/333.7, 334.1, 106, 270
See application file for complete search history.

(56) References Cited

U.S. PATENT DOCUMENTS

| 2,628,955 | A |   | 2/1953  | Parrish |        |
|-----------|---|---|---------|---------|--------|
| 2,981,755 | A | * | 4/1961  | Wiese ........................ | 570/186 |
| 4,327,201 | A |   | 4/1982  | Kennedy et al. |  |
| 4,946,889 | A |   | 8/1990  | Nishioka |  |
| 5,169,914 | A |   | 12/1992 | Kaszas et al. |  |
| 5,690,861 | A |   | 11/1997 | Faust |  |
| 5,883,207 | A | * | 3/1999  | Youn et al. ................ | 526/185 |
| 5,981,785 | A |   | 11/1999 | Faust et al. |  |

FOREIGN PATENT DOCUMENTS

| DE | 40 25 961 | 2/1992 |
|----|-----------|--------|
| EP | 0 206 756 | 12/1986 |
| EP | 0 264 214 | 4/1988 |
| EP | 0 265 053 | 4/1988 |
| EP | 0 722 957 | 7/1996 |
| WO | 99 24480  | 5/1999 |
| WO | 00 63256  | 10/2000 |
| WO | 02 16452  | 2/2002 |
| WO | 02 48215  | 6/2002 |

OTHER PUBLICATIONS

Mustafa, S.A. et al. "A new bifunctional initiator for living carbocationic polymerization of isobutylene: synthesis of linear telechelic polyisobutylene by the 1,4-DI(2-propyl-2-hydroxy)cyclohexane/BCI3/tert-Amine Initiating Systems", Journal of Polymer Science: Part A: Polymer Chemistry, vol. 31, pp. 2387-2391 1993.

Hadjikyriacou, Savvas et al. "Living Coupling Reaction in Living Cationic Polymerization. 3. Coupling Reaction of Living Polyisobutylene Using Bis(furanyl) Derivatives", Macromolecules, vol. 33, pp. 730-733 2000.

Hadjikyriacou, Savvas et al. "Cationic Macromolecular Design and Synthesis Using Furan Derivatives", Macromolecules, vol. 32, No. 20, pp. 6393-6399 1999.

Hadjikyriacou, Savvas et al. "Coupling and linking reactions of living polyisobutylene by allysilanes", Polymer Bulletin, vol. 43, pp. 121-128 1999.

Bae, Young Cheol et al. "Living Coupling Reaction In Living Cationic Polymerization. 1. Coupling Reaction of Living Polyisobutylene", Macromolecules, vol. 30, pp. 198-203 1997.

Bae, Young Cheol et al. "Living Coupling Reaction in Living Cationic Polymerization. 2. Synthesis and Characterization of Amphiphilic A2B2 Star-Block Copolymer: Poly[bis(isobutylene)-star-bis(methyl vinyl ether)]", Macromolecules, vol. 31, pp. 2480-2487 1998.

Storey, Robson F. et al. "In Situ Coupling of Living Polyisobutylene", Polymer Preprints, vol. 39, pp. 327-328 1998.

* cited by examiner

*Primary Examiner*—Fred Teskin
(74) *Attorney, Agent, or Firm*—Oblon, Spivak, McClelland, Maier & Neustadt, P.C.

(57) ABSTRACT

The present invention relates to a process for preparing an isobutene polymer using a cyclopentene derivative as initiator and to the isobutene polymer obtainable by means of the process and to particular functionalization products thereof.

14 Claims, No Drawings

METHOD FOR THE PRODUCTION OF ISOBUTENE POLYMERS

The present invention relates to a process for preparing an isobutene polymer and to the isobutene polymer obtainable by means of the process and particular functionalization products thereof.

Homopolymers and copolymers of isobutene are used in many ways, for example for producing fuel and lubricant additives, as elastomers, as adhesives or adhesive raw materials or as basic constituent of sealing compositions.

The preparation of isobutene polymers by living cationic polymerization of isobutene is known. The initiator system used generally comprises a Lewis acid and an organic compound which forms a carbocation or a cationogenic complex with the Lewis acid.

For further processing, for example to produce sealing compositions or adhesives (raw materials), telechelic isobutene polymers, i.e. polymers which have two or more reactive end groups, are particularly useful. These end groups are, in particular, carbon-carbon double bonds which can be functionalized further or groups which have been functionalized by means of a terminating agent. Thus, EP-A 722 957 describes the preparation of telechelic isobutene polymers using an at least bifunctional initiator such as dicumyl chloride. A disadvantage of the known processes is that the aromatic initiators described can react to form indanyl or diindane groups (cf. Cr. Pratrap, S. A. Mustafa, J. P. Heller, J. Polym. Sci. Part A, Polym. Chem. 1993, 31, pp. 2387–2391), which has an adverse effect on the targeted synthesis of defined telechelic isobutene polymers.

It is an object of the present invention to provide a process by means of which defined isobutene polymers, preferably telechelic isobutene polymers, can be obtained using a simple initiator system.

We have found that this object is achieved by a process for preparing an isobutene polymer, in which
a) isobutene and
b) a compound of the formula I

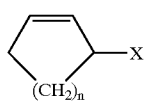

(I)

where
X is halogen, $C_1$–$C_6$-alkoxy or $C_1$–$C_6$-acyloxy and
n is 1, 2 or 3, are reacted in the presence of
c) a Lewis acid.

Halogen is preferably chlorine, bromine or iodine, in particular chlorine.

Suitable alkoxy groups are, for example, methoxy, ethoxy, propoxy and butoxy; suitable acyloxy groups include acetyloxy, propionyloxy and butyroxy.

In formula I, X is preferably a halogen, in particular chlorine. n is preferably 1 or 2, in particular 1.

The compound of the formula I is particularly preferably 3-chlorocyclopentene. This compound is known per se and can be prepared by reaction of cyclopentadiene with hydrogen chloride, cf. Moffett, Org. Synth. Col. IV, 1969, 238.

Possible Lewis acids are covalent metal halides and semimetal halides which have an electron pair gap. Such compounds are known to those skilled in the art, for example from J. P. Kennedy et al. in U.S. Pat. Nos. 4,946,889, 4,327,201, 5,169,914, EP-A-206 756, EP-A-265 053 and also in summarized form in J. P. Kennedy, B. Ivan, "Designed Polymers by Carbocationic Macromolecular Engineering", Oxford University Press, New York, 1991. They are generally selected from among halogen compounds of titanium, tin, aluminum, vanadium and iron and the halides of boron. Preference is given to the chlorides, and in the case of aluminum also monoalkylaluminum dichlorides and dialkylaluminum chlorides. Preferred Lewis acids are titanium tetrachloride, boron trichloride, boron trifluoride, tin tetrachloride, aluminum trichloride, vanadium pentachloride, iron trichloride, alkylaluminum dichlorides and dialkylaluminum chlorides. Particularly preferred Lewis acids are titanium tetrachloride, boron trichloride and boron trifluoride, in particular titanium tetrachloride.

It has been found to be useful to carry out the polymerization in the presence of an electron donor. Suitable electron donors are aprotic organic compounds which have a free electron pair located on a nitrogen, oxygen or sulfur atom. Preferred donor compounds are selected from among pyridines such as pyridine itself, 2,6-dimethylpyridine and sterically hindered pyridines such as 2,6-diisopropylpyridine and 2,6-di-tert-butylpyridine; amides, in particular N,N-dialkylamides of aliphatic and aromatic carboxylic acids, e.g. N,N-dimethylacetamide; lactams, in particular N-alkyllactams such as N-methylpyrrolidone; ethers, e.g. dialkyl ethers such as diethyl ether and diisopropyl ether, cyclic ethers such as tetrahydrofuran; amines, in particular trialkylamines such as triethylamine; esters, in particular $C_1$–$C_4$-alkyl esters of aliphatic $C_1$–$C_6$-carboxylic acids, e.g. ethyl acetate; thioethers, in particular dialkyl thioethers and alkyl aryl thioethers, e.g. methyl phenyl sulfide; sulfoxides, in particular dialkyl sulfoxides such as dimethyl sulfoxide; nitriles, in particular alkyl nitriles such as acetonitrile and propionitrile; phosphines, in particular trialkylphosphines and triarylphosphines, e.g. trimethylphosphine, triethylphosphine, tri-n-butylphosphine and triphenylphosphine and aprotic organosilicon compounds which are not capable of polymerization and bear at least one organic radical bound via oxygen.

Among the abovementioned donors, preference is given to pyridine and sterically hindered pyridine derivatives and also, in particular, organosilicon compounds.

Preferred organosilicon compounds of this type are those of the formula III:

$$R^a{}_n Si(OR^b)_{4-n} \qquad (III)$$

where
n is 1, 2 or 3,
$R^a$ may be identical or different and are each, independently of one another, $C_1$–$C_{20}$-alkyl, $C_5$–$C_7$-cycloalkyl, aryl or aryl-$C_1$–$C_4$-alkyl, where the latter three radicals may also bear one or more $C_1$–$C_{10}$-alkyl groups as substituents, and
$R^b$ are identical or different and are each $C_1$–$C_{20}$-alkyl or, when n is 1 or 2, two radicals $R^b$ may together form an alkylene group.

In the formula III, n is preferably 1 or 2. $R^a$ is preferably a $C_1$–$C_8$-alkyl group, in particular a branched alkyl group or an alkyl group which is bound via a secondary carbon atom, e.g. isopropyl, isobutyl, 2-butyl, or a 5-, 6- or 7-membered cycloalkyl group or an aryl group. The variable $R^b$ is preferably a $C_1$–$C_4$-alkyl group or a phenyl, tolyl or benzyl radical.

Examples of such preferred compounds are dimethoxydiisopropylsilane, dimethoxyisobutylisopropylsilane, dimethoxydiisobutylsilane, dimethoxydicyclopentylsilane, dimethoxyisobutyl-2-butylsilane, diethoxyisobutylisopropylsilane, triethoxytoluylsilane, triethoxybenzylsilane and triethoxyphenylsilane.

The Lewis acid is used in an amount which is sufficient to form the initiator complex. The molar ratio of Lewis acid to initiator is generally from 10:1 to 1:10, in particular from 1:1 to 1:4 and especially from 1:1.5 to 1:4.

Isobutene feedstocks which are suitable for use in the process of the present invention include both isobutene itself and isobutene $C_4$-hydrocarbon streams, for example $C_4$ raffinates, $C_4$ fractions from isobutene dehydrogenation, $C_4$ fractions from steam crackers and FCC plants (FCC: fluid catalytic cracking), as long as they have been largely freed of 1,3-butadiene. $C_4$-hydrocarbon streams which are suitable for the purposes of the present invention generally contain less than 500 ppm, preferably less than 200 ppm, of butadiene. When $C_4$ fractions are used as starting material, the hydrocarbons other than isobutene assume the role of an inert solvent.

The reaction can also be carried out using monomer mixtures of isobutene with olefinically unsaturated monomers which are copolymerizable with isobutene under cationic polymerization conditions. Furthermore, the process of the present invention is suitable for the block copolymerization of isobutene with ethylenically unsaturated comonomers which are polymerizable under cationic polymerization conditions. If monomer mixtures of isobutene with suitable comonomers are to be polymerized, the monomer mixture preferably comprises more than 80% by weight, in particular more than 90% by weight and particularly preferably more than 95% by weight, of isobutene and less than 20% by weight, preferably less than 10% by weight and in particular less than 5% by weight, of comonomers.

Possible copolymerizable monomers are vinylaromatics such as styrene and α-methylstyrene, $C_1$–$C_4$-alkylstyrenes such as 2-, 3-and 4-methylstyrene, and also 4-tert-butylstyrene, isoolefins having from 5 to 10 carbon atoms, e.g. 2-methyl-1-butene, 2-methyl-1-pentene, 2-methyl-1-hexene, 2-ethyl-1-pentene, 2-ethyl-1-hexene and 2-propyl-1-heptene. Further suitable comonomers are olefins which contain a silyl group, e.g. 1-trimethoxysilylethene, 1-(trimethoxysilyl)propene, 1-(trimethoxysilyl)-2-methyl-2-propene, 1-[tri(methoxyethoxy)-silyl]ethene, 1-[tri(methoxyethoxy)silyl]propene, and 1-[tri(meth-oxyethoxy)silyl]-2-methyl-2-propene.

The polymerization is usually carried out in a solvent. Possible solvents are all low molecular weight, organic compounds or mixtures thereof which have a suitable dielectric constant and no protons which can be abstracted and which are liquid under the polymerization conditions. Preferred solvents are hydrocarbons, e.g. acyclic hydrocarbons having from 2 to 8, preferably from 3 to 8, carbon atoms, e.g. ethane, isopropane and n-propane, n-butane and its isomers, n-pentane and its isomers, n-hexane and its isomers and also n-heptane and its isomers, and n-octane and its isomers, cyclic alkanes having from 5 to 8 carbon atoms, e.g. cyclopentane, methylcyclopentane, cyclohexane, methylcyclohexane, cycloheptane, acyclic alkenes preferably having from 2 to 8 carbon atoms, e.g. ethene, isopropene and n-propene, n-butene, n-pentene, n-hexene and n-heptene, cyclic olefins such as cyclopentene, cyclohexene and cycloheptene, aromatic hydrocarbons such as toluene, xylene, ethylbenzene, and also halogenated hydrocarbons such as halogenated aliphatic hydrocarbons, e.g. chloromethane, dichloromethane, trichloromethane, chloroethane, 1,2-dichloroethane and 1,1,1-trichloroethane and 1-chlorobutane, and halogenated aromatic hydrocarbons such as chlorobenzene and fluorobenzene. The halogenated hydrocarbons used as solvents do not include any compounds in which halogen atoms are located on secondary or tertiary carbon atoms.

Particularly preferred solvents are aromatic hydrocarbons, among which toluene is particularly preferred. Preference is likewise given to solvent mixtures which comprise at least one halogenated hydrocarbon and at least one aliphatic or aromatic hydrocarbon. In particular, the solvent mixture comprises hexane and chloromethane and/or dichloromethane. The volume ratio of hydrocarbon to halogenated hydrocarbon is preferably in the range from 1:10 to 10:1, particularly preferably in the range from 4:1 to 1:4 and in particular in the range from 2:1 to 1:2.

The process of the present invention is generally carried out at below 0° C., e.g. in the range from 0 to −140° C., preferably in the range from −30 to −120° C. and particularly preferably in the range from −40 to −110° C. The reaction pressure is of subordinate importance.

The heat of reaction is removed in a customary manner, for example by wall cooling and/or by exploiting evaporative cooling. Here, the use of ethene and/or mixtures of ethene with the solvents mentioned above as preferred has been found to be useful.

To prepare block copolymers, the distal chain end, i.e. the end of the isobutene polymer obtained which is furthest from the initiator, can be reacted with comonomers such as those mentioned above, e.g. vinylaromatics. Thus, for example, it is possible firstly to homopolymerize isobutene and subsequently add the comonomer. The freshly formed reactive chain end originating from the comonomer is either deactivated or, according to one of the embodiments described below, terminated to form a functional end group or reacted once again with isobutene to form higher block copolymers.

To stop the reaction, the living chain ends are deactivated, for example by addition of a protic compound, in particular by addition of water, alcohols such as methanol, ethanol, n-propanol, isopropanol, n-butanol, isobutanol, sec-butanol or tert-butanol, or their mixtures with water.

To obtain bifunctional (telechelic) isobutene polymers, the distal chain end is terminated to form an ethylenically unsaturated group by, for example, reacting the reactive chain end with a terminating reagent which attaches an ethylenically unsaturated group to the chain end or by treating the reactive chain end in a suitable fashion to convert it into such a group.

In one embodiment, the chain end is terminated by addition of a trialkylallylsilane compound, e.g. trimethylallylsilane. The use of allylsilanes leads to termination of the polymerization with introduction of an allyl radical at the end of the polymer chain, cf. EP 264 214.

In a further embodiment, the reactive chain end is converted into a methylidene double bond either thermally, for example by heating to from 70 to 200° C., or by treatment with a base. Suitable bases are, for example, alkali metal alkoxides such as sodium methoxide, sodium ethoxide and potassium tert-butoxide, basic aluminum oxide, alkali metal hydroxides such as sodium hydroxide and tertiary amines such as pyridine or tributylamine, cf. Kennedy et al., Polymer Bulletin 1985, 13, 435–439. Preference is given to using sodium ethoxide.

In a further embodiment, the reactive chain end is reacted with a conjugated diene such as butadiene, cf. DE-A 40 25 961.

In a further embodiment, two or more living polymer chains are coupled by addition of a coupling agent. The term "coupling" refers to the formation of chemical bonds between the reactive chain ends, so that two or more polymer chains are joined to form one molecule. The molecules obtained by the coupling reaction are symmetrical telechelic or star-shaped molecules having cycloalkenyl groups at the ends of the molecule or the ends of the branches of the star-shaped molecule. In this way, triblock copolymers of the AB-BA type, where A is a polyisobutene block and B is a polymer block different therefrom, e.g. a polyvinylaromatic block, can be obtained by coupling of living copolymers of the AB⁺ type.

Suitable coupling agents have, for example, at least two electrofugic leaving groups, e.g. trialkylsilyl groups, located in allylic positions relative to identical or different double bonds, so that the cationic center of a reactive chain end can be added on in a concerted reaction with elimination of the leaving group and shifting of the double bond. Other coupling agents have at least one conjugated system onto which the cationic center of a reactive chain end can add electrophilically to form a stabilized cation. Elimination of a leaving group, e.g. a proton, then produces a stable a bond to the polymer chain with reformation of the conjugated system. A plurality of these conjugated systems can be joined to one another via inert spacers.

Suitable coupling agents include:

(i) compounds which have at least two 5-membered heterocycles containing a heteroatom selected from among oxygen, sulfur and nitrogen, e.g. organic compounds having at least two furan rings, e.g.

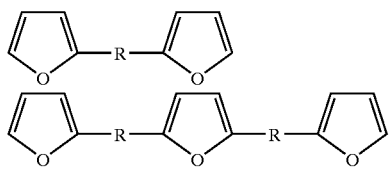

where R is $C_1$–$C_{10}$-alkylene, preferably methylene or 2,2-propanediyl;

(ii) compounds having at least two trialkylsilyl groups in allylic positions, for example 1,1-bis(trialkylsilylmethyl)-ethylene, e.g. 1,1-bis(trimethylsilylmethyl)ethylene, bis[(trialkylsilyl)propenyl]benzenes, e.g.

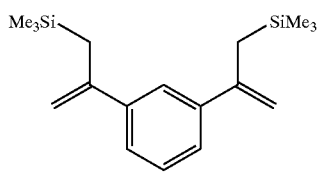

(where Me is methyl), (iii) compounds having at least two vinylidene groups conjugated with in each case two aromatic rings, for example bis(diphenyl)ethylenes, e.g.

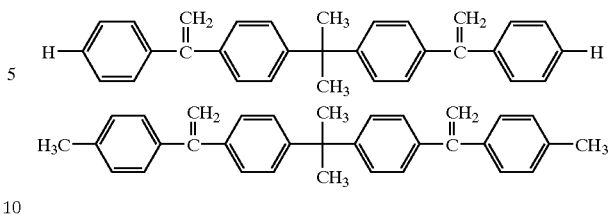

A description of suitable coupling agents may be found in the following references; the coupling reaction can be carried out in a manner analogous to the reactions described there: R. Faust, S. Hadjikyriacou, Macromolecules 2000, 33, 730–733; R. Faust, S. Hadjikyriacou, Macromolecules 1999, 32, 6393–6399; R. Faust, S. Hadjikyriacou, Polym. Bull. 1999, 43, 121–128; R. Faust, Y. Bae, Macromolecules 1997, 30, 198; R. Faust, Y. Bae, Macromolecules 1998, 31, 2480; R. Storey, Maggio, Polymer Preprints, 1998, 39, 327–328; WO99/24480; U.S. Pat. No. 5,690,861 and U.S. Pat. No. 5,981,785.

The coupling reaction generally occurs in the presence of a Lewis acid, with suitable Lewis acids including those which can also be employed for carrying out the actual polymerization reaction. In addition, the coupling reaction can be carried out using the same solvents and temperatures which are used for carrying out the actual polymerization reaction. The coupling reaction can therefore advantageously be carried out as a one-pot reaction subsequent to the polymerization reaction in the same solvent in the presence of the Lewis acid used for the polymerization. The coupling agent is usually used in a molar amount which corresponds approximately to the molar amount of the initiator of the formula I used for the polymerization divided by the number of coupling sites on the coupling agent.

After the reactive chain end has been terminated or after the coupling reaction, the solvent is generally removed in suitable apparatuses such as rotary, falling film or thin film evaporators or by depressurization of the reaction solution.

The isobutene polymers prepared by the process of the present invention have a narrow molecular weight distribution. The polydispersity index $PDI=M_w/M_n$ is preferably below 1.40, particularly preferably below 1.35.

The isobutene polymers prepared according to the present invention are terminated at one end of the chain by the cycloalkene ring of the initiator of the formula I. The end group at the opposite end is preferably an ethylenically unsaturated group which can be obtained as described above either thermally or by reaction of the reactive chain end with a suitable base, a trialkylallylsilane compound or a conjugated diene.

The present invention further provides an isobutene polymer which is terminated at at least one end of the molecule by a group of the formula II,

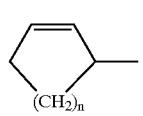

(II)

where n is 1, 2 or 3, or a functionalization product thereof which is obtainable by
i) hydrosilylation,
ii) hydrosulfurization, iii) electrophilic substitution on aromatics,
iv) epoxidation and, if desired, reaction with nucleophiles,
v) hydroboration and, if desired, oxidative cleavage,
vi) reaction with an enophile in an ene reaction,
vii) addition of halogens or hydrogen halides or
viii) hydroformylation.

The functionalization reactions described can be carried out not only at the terminating group II but also at an unsaturated end group at the other end. Owing to the differing reactivities of the terminating group II and the unsaturated group at the other end, these can also be functionalized differently.

i) Hydrosilylation

To carry out the functionalization, a polyisobutene prepared by the process of the present invention can be subjected to a reaction with a silane in the presence of a silylation catalyst to give a polyisobutene which is at least partially functionalized with silyl groups.

Suitable hydrosilylation catalysts are, for example, transition metal catalysts in which the transition metal is preferably selected from among Pt, Pd, Rh, Ru and Ir. Suitable platinum catalysts include, for example, platinum in finely divided form ("platinum black"), platinum chloride and platinum complexes such as hexachloroplatinic acid or divinyldisiloxane platinum complexes, e.g. tetramethyldivinyldisiloxane-platinum complexes. Examples of suitable rhodium catalysts are $RhCl(P(C_6H_5)_3)_3$ and $RhCl_3$. $RuCl_3$ and $IrCl_3$ are also suitable. Further suitable catalysts are Lewis acids such as $AlCl_3$ or $TiCl_4$ and peroxides. It may be advantageous to use combinations or mixtures of the above-mentioned catalysts.

Suitable silanes are, for example, halogenated silanes such as trichlorosilane, methyldichlorosilane, dimethylchlorosilane and trimethylsiloxydichlorosilane; alkoxysilanes such as trimethoxysilane, triethoxysilane, methyldimethoxysilane, phenyldimethoxysilane, 1,3,3,5,5,7,7-heptamethyl-1,1-dimethoxytetrasiloxane, and also acyloxysilanes.

The reaction temperature in the silylation is preferably in a range from 0 to 140° C., particularly preferably from 40 to 120° C. The reaction is usually carried out under atmospheric pressure, but it can also be carried out under superatmospheric pressures, e.g. in the range from about 1.5 to 20 bar, or reduced pressures, e.g. from 200 to 600 mbar.

The reaction can be carried out in the absence of solvent or in the presence of a suitable solvent. Preferred solvents are, for example, toluene, tetrahydrofuran and chloroform.

ii) Hydrosulfurization

To carry out the functionalization, a polyisobutene prepared by the process of the present invention can be subjected to a reaction with hydrogen sulfide or a thiol, e.g. alkyl or aryl thiols, hydroxymercaptans, aminomercaptans, thiocarboxylic acids or silane thiols to give a polyisobutene which is at least partially functionalized with thio groups. Suitable hydro-alkylthio additions are described in J. March, Advanced Organic Chemistry, 4th edition, John Wiley & Sons, pp. 766–767, which is hereby fully incorporated by reference. The reaction can generally be carried out either in the absence or presence of initiators or in the presence of electromagnetic radiation. The addition of hydrogen sulfide gives polyisobutenes functionalized with thiol groups. The addition of hydrogen sulfide is preferably carried out at below 100° C. and at a pressure of from 1 to 50 bar, particularly preferably about 10 bar. Furthermore, the addition is preferably carried out in the presence of a cation exchange resin such as Amberlyst 15. In the case of the reaction with thiols in the absence of initiators, the Markovnikov addition products onto the double bond are generally obtained. Suitable initiators for the hydro-alkylthio addition are, for example, protic and Lewis acids, e.g. concentrated sulfuric acid or $AlCl_3$, and acidic cation exchangers such as Amberlyst 15. Suitable initiators also include those which are capable of forming free radicals, e.g. peroxides or azo compounds. The hydro-alkylthio addition in the presence of these initiators generally gives the anti-Markovnikov addition products. The reaction can also be carried out in the presence of electromagnetic radiation having a wavelength of from 400 to 10 nm, preferably from 200 to 300 nm.

iii) Electrophilic Substitution on Aromatics

To form the derivative, a polyisobutene prepared by the process of the present invention can be reacted with a compound which contains at least one aromatic or heteroaromatic group in the presence of an alkylation catalyst. Suitable aromatic and heteroaromatic compounds, catalysts and reaction conditions for this Friedel-Crafts alkylation are described, for example, in J. March, Advanced Organic Chemistry, 4th edition, John Wiley & Sons, pp. 534–539, which is hereby incorporated by reference.

The alkylation is preferably carried out using an activated aromatic compound. Suitable aromatic compounds are, for example, alkylaromatics, alkoxyaromatics, hydroxyaromatics and activated heteroaromatics such as thiophenes or furans.

The aromatic hydroxy compound used for the alkylation is preferably selected from among phenolic compounds which have 1, 2 or 3 OH groups and may bear at least one further substituent. Preferred further substituents are $C_1$–$C_8$-alkyl groups, in particular methyl and ethyl. Preferred compounds are, in particular, those of the formula,

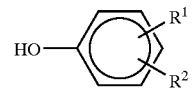

where $R^1$ and $R^2$ are each, independently of one another, hydrogen, OH or $CH_3$. Particular preference is given to phenol, the cresol isomers, catechol, resorcinol, pyrogallol, fluoroglucinol and the xylenol isomers. In particular, phenol, o-cresol and p-cresol are used. If desired, it is also possible to use mixtures of the abovementioned compounds for the alkylation.

Further suitable compounds are polyaromatics such as polystyrene, polyphenylene oxide or polyphenylene sulfide, or copolymers of aromatics, for example with butadiene, isoprene, (meth)acrylic acid derivatives, ethylene or propylene.

The catalyst is preferably selected from among Lewis-acid alkylation catalysts, which for the purposes of the present invention include both single acceptor atoms and acceptor ligand complexes, molecules, etc., as long as an overall unit displays, i.e. displays toward other molecules, Lewis-acid (electron acceptor) properties. Such catalysts include, for example, $AlCl_3$, $AlBr_3$, $BF_3$, $BF_3 \cdot 2C_6H_5OH$, $BF_3[O(C_2H_5)_2]_2$, $TiCl_4$, $SnCl_4$, $AlC_2H_5Cl_2$, $FeCl_3$, $SbCl_5$ and $SbF_5$. These alkylation catalysts can be used together with a cocatalyst, for example an ether. Suitable ethers are di($C_1$–$C_8$-alkyl)ethers such as dimethyl ether, diethyl ether, di-n-propyl ether, and also tetrahydrofuran, di($C_5$–$C_8$-cycloalkyl) ethers such as dicyclohexyl ether and ethers having at least one aromatic hydrocarbon radical, e.g. anisole. If a catalyst-cocatalyst complex is used for the Friedel-Crafts alkylation, the molar ratio of catalyst to cocatalyst is preferably in a range from 1:10 to 10:1. The reaction can also be catalyzed by protic acids such as sulfuric acid, phosphoric acid, trifluoromethanesulfonic acid. Organic protic acids can also be in the form of acid groups bound to a polymer, for example as ion exchange resin. Zeolites and inorganic polyacids are also suitable.

The alkylation can be carried out in the absence of solvent or in a solvent. Suitable solvents are, for example, n-alkanes and mixtures thereof and alkylaromatics such as toluene, ethylbenzene and xylene and also halogenated derivatives thereof.

The alkylation is preferably carried out at from −10° C. to +100° C. The reaction is usually carried out at atmospheric pressure, but it can also be carried out under higher or lower pressures.

Appropriate choice of the molar ratios of aromatic or heteroaromatic compound to polyisobutene and choice of the catalyst enables the proportion of alkylated products and their degree of alkylation to be set. Essentially monoalkylated polyisobutenylphenols are generally obtained when using an excess of phenol or in the presence of a Lewis-acid alkylation catalyst when an ether is additionally used as cocatalyst.

Further functionalization can be carried out by subjecting the resulting polyisobutenylphenol to a reaction of the Mannich type with at least one aldehyde, for example formaldehyde, and at least one amine which has at least one primary or secondary amine function to give a compound which is alkylated with polyisobutene and, in addition, at least partially aminoalkylated. It is also possible to use reaction products and/or condensation products of aldehyde and/or amine. The preparation of such compounds is described in WO 01/25 293 and WO 01/25 294, which are hereby fully incorporated by reference.

iv) Epoxidation

To carry out the functionalization, a polyisobutene prepared by the process of the present invention can be reacted with at least one peroxide compound to give an at least partially epoxidized polyisobutene. Suitable epoxidation processes are described in J. March, Advanced Organic Chemistry, 4th edition, John Wiley & Sons, pp. 826–829, which is hereby incorporated by reference. As peroxide compound, use is preferably made of at least one peracid such as m-chloroperbenzoic acid, performic acid, peracetic acid, trifluoroperacetic acid, perbenzoic acid and 3,5-dinitroperbenzoic acid. The peracids can be prepared in situ from the corresponding acids and $H_2O_2$, if appropriate in the presence of mineral acids. Further suitable epoxidation reagents are, for example, alkaline hydrogen peroxide, molecular oxygen and alkyl peroxides such as tert-butyl hydroperoxide. Suitable solvents for the epoxidation are, for example, customary nonpolar solvents. Particularly useful solvents are hydrocarbons such as toluene, xylene, hexane or heptane. The epoxide formed can subsequently be subjected to a ring-opening reaction with water, acids, alcohols, thiols or primary or secondary amines to give, inter alia, diols, glycol ethers, glycol thioethers and amines.

v) Hydroboration

To carry out the functionalization, a polyisobutene prepared by the process of the invention can be subjected to a reaction with a borane (if desired generated in situ) to give an at least partially hydroxylated polyisobutene. Suitable hydroboration processes are described in J. March, Advanced Organic Chemistry, 4th edition, John Wiley & Sons, pp. 783–789, which is hereby incorporated by reference. Suitable hydroboration reagents are, for example, diborane which is generally generated in situ by reaction of sodium borohydride with $BF_3$-etherate, diisoamylborane (bis[3-methylbut-2-yl]borane), 1,1,2-trimethylpropylborane, 9-borabicyclo[3.3.1]nonane, diisocamphenylborane, which are obtainable by hydroboration of the corresponding alkenes by means of diborane, chloroborane dimethyl sulfide, alkyldichloroboranes or $H_3B—N(C_2H_5)_2$.

The hydroboration is usually carried out in a solvent. Suitable solvents for the hydroboration are, for example, acyclic ethers such as diethyl ether, methyl tert-butyl ether, dimethoxyethane, diethylene glycol dimethyl ether, triethylene glycol dimethyl ether, cyclic ethers such as tetrahydrofuran or dioxane and also hydrocarbons such as hexane or toluene or mixtures thereof. The reaction temperature is generally determined by the reactivity of the hydroboration agent and is normally between the melting and boiling points of the reaction mixture, preferably in the range from 0° C. to 60° C.

The hydroboration agent is usually used in an excess over the alkene. The boron atom adds preferentially onto the less substituted and thus less sterically hindered carbon atom.

The alkylboranes formed are usually not isolated but converted directly by subsequent reaction into the desired products. A very important reaction of alkylboranes is the reaction with alkaline hydrogen peroxide to give an alcohol which preferably corresponds formally to the anti-Markovnikov hydration of the alkene. The alkylboranes obtained can also be subjected to a reaction with bromine in the presence of hydroxide ions to give the bromide.

vi) Ene Reaction

To carry out the functionalization, a polyisobutene prepared by the process of the present invention can be reacted in an ene reaction with at least one alkene having an electrophilically substituted double bond (cf., for example, DE-A 4 319 672 or H. Mach and P. Rath in "Lubrication Science II (1999), pp. 175–185, which are hereby fully incorporated by reference). In the ene reaction, an alkene having an allylic hydrogen atom, which is designated as ene, is reacted with an electrophilic alkene, known as the enophile, in a pericyclic reaction which comprises formation of a carbon-carbon bond, a double bond shift and a hydrogen transfer. In the present case, the polyisobutene reacts as the ene. Suitable enophiles are compounds which are also used as dienophiles in the Diels-Alder reaction. Preference is given to using maleic anhydride as enophile. This results in polyisobutenes functionalized at least partially with succinic anhydride groups.

The ene reaction can, if appropriate, be carried out in the presence of a Lewis acid as catalyst. Examples of suitable Lewis acids are aluminum chloride and ethylaluminum chloride.

For further functionalization, a polyisobutene functionalized with succinic anhydride groups, for example, can be subjected to a subsequent reaction selected from among:

α) reaction with at least one amine to give a polyisobutene which is at least partially functionalized with succinimide groups and/or succinamide groups, β) reaction with at least one alcohol to give a polyisobutene which is at least partially functionalized with succinic ester groups, and γ) reaction with at least one thiol to give a polyisobutene which is at least partially functionalized with succinic thio ester groups.

vii) Addition of Halogen or Hydrogen Halides

To carry out the functionalization, a polyisobutene prepared by the process of the present invention can be subjected to a reaction with a hydrogen halide or a halogen to give a polyisobutene which is at least partially functionalized with halogen groups. Suitable reaction conditions for the hydro-halo addition are described in J. March, Advanced Organic Chemistry, 4th edition, John Wiley & Sons, pp. 758–759, which is hereby incorporated by reference. The addition of hydrogen halide can in principle be carried out using HF, HCl, HBr and HI. The addition of HI, HBr and HF can in general be carried out at room temperature, while elevated temperatures are generally used for the addition of HCl.

The addition of hydrogen halides can in principle be carried out in the absence or in the presence of initiators or of electromagnetic radiation. When the addition is carried out in the absence of initiators, especially of peroxides, the Markovnikov addition products are generally obtained. When peroxides are added, the addition of HBr generally leads to anti-Markovnikov products.

The halogenation of double bonds is described in J. March, Advanced Organic Chemistry, 4th edition, John Wiley & Sons, pp. 812–814, which is hereby incorporated by reference. The addition of Cl, Br and I can be carried out using the free halogens. To obtain compounds halogenated by more than one halogen, the use of interhalogen compounds is known. The addition of fluorine is generally carried out using fluorine-containing compounds such as $CoF_3$, $XeF_2$ and mixtures of $PbO_2$ and $SF_4$. Bromine generally adds onto double bonds in good yields at room temperature. The addition of chlorine can be carried out using chlorine-containing reagents such as $SO_2Cl_2$, $PCl_5$ etc., instead of the free halogen.

If the halogenation is carried out using chlorine or bromine in the presence of electromagnetic radiation, this gives essentially the products of free-radical substitution on the polymer chain and not, or only to a minor extent, products of addition onto the terminal double bond.

Certain polyisobutenes obtainable by the process of the present invention which are terminated at one end of the chain by a group of the formula II and have a different, above-described, terminating group at the other end of the chain can, owing to the differing reactivities of the terminal groups, be functionalized differently. This is of particular advantage for use of the polyisobutene in fuels and lubricants, since hydrophilic and hydrophobic properties have to be matched here. Furthermore, the ready availability of the compound of the formula I is an advantage. Since a chain growing only at one end is initiated by means of the compound of the formula I, the amount of Lewis acid and termination reagent required is reduced compared to polyfunctional initiators. In addition, the terminal group originating from the initiator is not subject to the secondary reactions mentioned at the outset which occur when using polyfunctional aromatic initiators of the prior art.

The following examples illustrate the invention.

EXAMPLES 1 TO 9

Polymerization

The apparatus used comprised a 2 l four-necked flask provided with stirrer, dry ice cooling and two coolable 1 l dropping funnels. Both dropping funnels contained a bed of dry 3 Å molecular sieves over glass wool. In one dropping funnel, 600 ml of the solvent mixture indicated in each case in Table 1 were dried at −78° C. for 20 minutes. The solvent mixture was then introduced into the reaction flask which had been precooled to −70° C. Isobutene was condensed into the second, cooled dropping funnel and this was then added to the solvent mixture over a period of 25 minutes. While stirring vigorously, the amounts indicated in Table 1 of electron donor, 3-chlorocyclopentene and titanium tetrachloride were added in succession at −70° C. via a septum. After stirring for 2 hours at from −50 to −70° C., the polymerization was stopped by addition of ethanol or isopropanol (Examples 1, 7 and 9) or allyltrimethylsilane was added, the mixture was stirred for a further 30 minutes at from −50 to −70° C. and then ethanol or isopropanol was added (Examples 2 to 6 and 8). The reaction solution was warmed to room temperature and washed 3 times with water. The solution was subsequently evaporated to dryness at 180° C. under reduced pressure. The number average and weight average molecular weights were determined by means of gel chromatography. These values and the polydispersity index (PDI) are likewise reported in Table 1. The presence of the cyclopentenyl end group in the polymeric solid was confirmed by means of the $^1$H-NMR spectra ($\delta_{CP}$=5.55–5.75).

TABLE 1

| Ex. | IB [mol] | $CH_2Cl_2$ [ml] | Hexane [ml] | $CH_3Cl$ [ml] | $TiCl_4$ [mmol] | Chloro-CP [mmol] | Donor [mmol] | Allyl TMS [mmol] | T [° C.] | $M_w$ | $M_n$ | PDI |
|---|---|---|---|---|---|---|---|---|---|---|---|---|
| 1 | 4.28 | 300 | 300 | — | 26.0 | 50.0 | $Ph(EtO)_3Si$ | 6.00 | — | −50 | 5855 | 4722 | 1.24 |
| 2 | 4.28 | 300 | 300 | — | 26.0 | 50.0 | $Ph(EtO)_3Si$ | 6.00 | 75.0 | −50 | 5774 | 4893 | 1.18 |
| 3 | 4.28 | 300 | 300 | — | 26.0 | 50.0 | $Ph(EtO)_3Si$ | 6.00 | 75.0 | −70 | 6251 | 4846 | 1.29 |
| 4 | 4.28 | 300 | 300 | — | 13.0 | 50.0 | $Ph(EtO)_3Si$ | 6.00 | 75.0 | −50 | 6251 | 4846 | 1.29 |
| 5 | 4.28 | 300 | 300 | — | 13.0 | 30.0 | $Ph(EtO)_3Si$ | 6.00 | 75.0 | −50 | 9660 | 8050 | 1.20 |
| 6 | 4.28 | 300 | 300 | — | 13.0 | 20.0 | $Ph(EtO)_3Si$ | 6.00 | 75.0 | −50 | 14836 | 11869 | 1.25 |
| 7 | 2.20 | — | 360 | 240 | 22.0 | 2.0 | Di-tert-butylpyridine | 2.10 | — | −50 | 68215 | 58303 | 1.17 |
| 8 | 4.28 | 300 | 300 | — | 13.0 | 50.0 | Pyridine | 6.00 | 75.0 | −50 | 6535 | 4877 | 1.34 |
| 9 | 3.11 | 300 | 300 | — | 8.0 | 174.0 | Pyridine | 1.90 | — | −70 | 1127 | 847 | 1.33 |

IB = isobutene
Chloro-CP = 3-chlorocyclopentene
AllylTMS = allyltrimethylsilane

EXAMPLES 10 TO 12

Hydrosilylation

EXAMPLE 10

67.8 g (0.08 mol) of the polymer obtained in Example 9 were placed in a reaction vessel, admixed with 1 ml of a 0.1 M $H_2PtCl_6 \times 6H_2O$ solution in isopropanol and the mixture was heated to 120° C. 22.1 g (0.19 mol) of dichloromethylsilane were slowly added to the reaction mixture and the temperature was maintained at 120° C. for 8 hours. At room temperature, 100 ml of dry THF and 100 g of a 30% strength sodium methoxide solution in methanol were subsequently added and the mixture was stirred at room temperature for 12 hours. Insoluble constituents were filtered off and methanol and THF were distilled off. This gave an isobutene polymer having the following end groups:

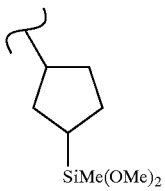 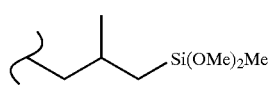

The NMR spectrum indicated quantitative hydrosilylation of the cyclopentenyl-substituted chain end (complete disappearance of the olefinic ring protons). The degree of functionalization of the isopropenyl-substituted chain end was 80%.

EXAMPLE 11

59.3 g (0.07 mol) of the polymer obtained in Example 9 were dissolved in dry THF and admixed with 1.0 ml of 1,3-divinyl-1,1,3,3-tetramethyldisiloxane-platinum(0) complex (0.1 M solution in poly(dimethylsiloxane)). At 60° C., 19.6 g (0.17 mol) of dichloromethylsilane were then added slowly. After refluxing for 3 hours, the reaction mixture was cooled and admixed with 70 g of a 30% strength sodium methoxide solution in methanol. After stirring for 12 hours at room temperature, insoluble constituents were filtered off and methanol and THF were distilled off. This gave an isobutene polymer having the following end groups:

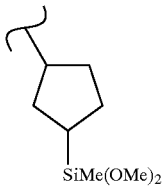 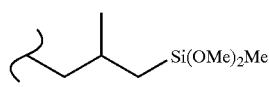

The NMR spectrum indicated quantitative hydrosilylation of the cyclopentenyl-substituted chain end (complete disappearance of the olefinic ring protons). The degree of functionalization of the isopropenyl-substituted chain end was 20%.

EXAMPLE 12

20 g (4 mmol) of isobutene polymer from Example 2 were dissolved in 120 ml of dry toluene, admixed with 0.1 ml of a 0.1 M $H_2PtCl_6 \times 6H_2O$ solution in isopropanol, and 1.15 g (10 mmol) of dichloromethylsilane were added. The mixture was subsequently stirred at 90° C. for 12 hours. At room temperature, 30 g of a 30% strength sodium methoxide solution in methanol were then added and the mixture was stirred at room temperature for 12 hours. Insoluble constituents were filtered off and the solvent was distilled off. This gave an isobutene polymer having the following end groups:

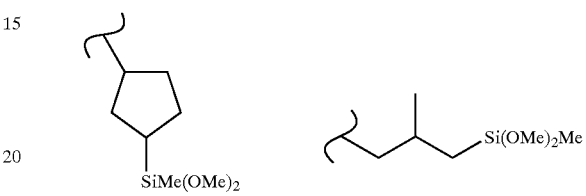

The NMR spectrum indicated quantitative functionalization of both ends of the chain (complete disappearance of all olefinic ring protons).

EXAMPLES 13 AND 14

Polymerization and Coupling

EXAMPLE 13

300 ml of hexane, 300 ml of methylene chloride and 4.28 mol of isobutylene were placed in a reaction vessel at −78° C. and admixed with 6.0 mmol of phenyltriethoxysilane and 90 mmol of 3-chlorocyclopentene. The polymerization was subsequently started by addition of 80 mmol of titanium tetrachloride. After stirring at −78° C. for 90 minutes, a solution of 49 mmol of 2,5-bis(2-furylmethyl)furan in hexane/methylene chloride was added. After stirring at −78° C. for 2 hours, the reaction was stopped by addition of water, the organic phase was separated off and filtered through silica gel. Removal of the solvent left a polyisobutene polymer having an $M_n$ of 5500 ($M_w/M_n$−1.4).

The $^1$H-NMR spectrum indicated quantitative coupling, as shown by the absence of the signals of the —$CH_2C(CH_3)_2$Cl group at 1.69 and 1.95 ppm (relative to TMS) or the signals of the olefinic protons of the polyisobutene-α- and -β-olefin.

EXAMPLE 14

300 ml of hexane, 300 ml of methylene chloride and 4.28 mol of isobutylene were placed in a reaction vessel at −78° C. and admixed with 6.0 mmol of phenyltriethoxysilane, 6.1 mmol of di(tert-butyl)pyridine and 50 mmol of 3-chlorocyclopentene. The polymerization was subsequently started by addition of 26 mmol of titanium tetrachloride. After stirring at −78° C. for 90 minutes, a solution of 27 mmol of 2,5-bis(2-furyl-2-propyl)furan in hexane/methylene chloride was added. After stirring at −78° C. for 2 hours, the reaction was stopped by addition of water, the organic phase was separated off and filtered through silica gel. Removal of the solvent left a polyisobutene polymer having an Mn of 8900 ($M_w/M_n$−1.5).

The $^1$H-NMR spectrum indicated quantitative coupling, as shown by the absence of the signals of the—$CH_2C(CH_3)_2$Cl group at 1.69 and 1.95 ppm (relative to

EXAMPLE 15

Epoxidation of the Polyisobutene

A solution of 100 g (0.02 mol) of the polyisobutene from example 1 in 100 ml of toluene was placed in a 0.5 l four-neck flask. 1.8 g (0.04 mol) of formic acid was subsequently added. The mixture was warmed to 80° C. and 2.8 g (0.04 mol) of $H_2O_2$ solution were added dropwise. The mixture was stirred at 90° C. for 45 minutes. After cooling to room temperature, the aqueous phase was separated off. 1 g (0.02 mol) of formic acid was subsequently added to the organic solution, the mixture was again heated to 80° C. and 1.4 g (0.02 mol) of $H_2O_2$ solution were added dropwise. After 1 hour at 90° C., the aqueous phase was separated off and the organic phase was washed with 20 ml of saturated $NaHCO_3$ solution, 20 ml of water and 20 ml of saturated $FeSO_4 \cdot 7H_2O$ solution. The organic phase was evaporated on a rotary evaporator at 120° C./4 mbar. This gave 92 g of α,ω-diepoxypolyisobutene as a light-colored, viscous mass.

$^1$H-NMR (in $CD_2Cl_2$, 16 scans at 500 MHz):

The olefinic signals (5.7 ppm; 5.1 ppm; 4.8 and 4.6 ppm) had disappeared, and new signals had appeared at 2.6 ppm and 1.8 ppm, corresponding to 3.9 H atoms.

EXAMPLE 16

Friedel-Crafts Reaction of a Polyisobutene with Phenol

A solution of 9.6 g (0.1 mol) of phenol in 10 ml of toluene was placed in a 1 l four-neck flask, and 1.3 g (0.005 mol) of $BF_3$-phenol complex was then added. 100 g (0.02 mol) of the polyisobutene from example 1 were dissolved in 200 ml of heptane and added dropwise over a period of 30 minutes. The mixture was stirred at room temperature for 12 hours and the reaction was stopped by addition of 200 ml of methanol. The methanol phase was discarded, and the reaction mixture was washed twice more with 200 ml of methanol.

The organic phase was evaporated on a rotary evaporator at 140° C./4 mbar. This gave 96 g of α,ω-(4-hydroxyphenyl)-polyisobutene as a light-colored, viscous mass.

$^1$H-NMR (in $CD_2Cl_2$, 16 scans at 500 MHz):

The olefinic signals (5.7 ppm; 5.1 ppm; 4.8 and 4.6 ppm) had disappeared, and two new doublet signals had appeared at 6.7 and 7.2 ppm, corresponding to 7.5 H atoms.

EXAMPLE 17

Reaction of a Polyisobutene with $H_2S$

A solution of 1.9 g (7.5 mmol) of $BF_3$-phenol complex in 20 ml of $CH_2Cl_2$ was placed in a 0.3 l stirring autoclave. The autoclave was then pressurized at room temperature with 15 g of $H_2S$, and 100 g (0.02 mol) of the polyisobutene from example 1 in 100 ml of $CH_2Cl_2$ were subsequently added. The mixture was maintained at room temperature for 4 hours, the autoclave was vented and the excess $H_2S$ was destroyed by passing it into a sodium hypochlorite solution. The solution was washed with water and evaporated on a rotary evaporator at 140° C./4 mbar. This gave 89 g of α,ω-polyisobutendithiol as a light-colored, viscous mass.

$^1$H-NMR (in $CD_2Cl_2$, 16 scans at 500 MHz):

New signal at 1.9 ppm, corresponding to 1.9 H atoms (—SH).

What is claimed is:

1. A process for preparing an isobutene polymer comprising
  reacting
  a) isobutene and
  b) a compound of the formula I

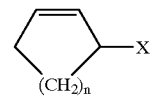

in the presence of
  c) a Lewis acid
  to obtain a living isobutene polymer having at least one distal end,
  wherein
  X is halogen, $C_1$–$C_6$-alkoxy or $C_1$–$C_6$-acyloxy and
  n is 1, 2 or 3.

2. The process as claimed in claim 1, wherein the compound of the formula I is 3-chlorocyclopentene.

3. The process as claimed in claim 1, wherein the reaction is carried out in the additional presence of an electron donor.

4. The process as claimed in claim 1, wherein the reaction is carried out in an aromatic hydrocarbon or in a solvent mixture of a halogenated hydrocarbon and an aliphatic or aromatic hydrocarbon.

5. The process as claimed in claim 4, wherein the halogenated hydrocarbon is at least one selected from the group consisting of chloromethane, dichloromethane, trichloromethane, 1-chlorobutane and chlorobenzene, and the aliphatic or aromatic hydrocarbon is at least one selected from the group consisting of butane, pentane, neopentane, hexane, cyclohexane, methylcyclohexane, heptane, octane, benzene, toluene and xylene.

6. The process as claimed in claim 1, wherein the Lewis acid is at least one selected from the group consisting of titanium tetrachloride, boron trichloride, tin tetrachloride, aluminum trichloride, dialkylaluminum chlorides, alkylaluminum dichlorides, vanadium pentachloride, iron trichloride and boron trifluoride.

7. The process as claimed in claim 3, wherein the electron donor is at least one selected from the group consisting of pyridines, amides, lactams, ethers, amines, esters, thioethers, sulfoxides, nitriles, phosphines and aprotic organosilicon compounds wherein the aprotic organosilicon compounds are not capable of polymerization and bear at least one organic radical bound via oxygen.

8. The process as claimed in claim 1, further comprising reacting the distal end with at least one comonomer.

9. The process as claimed in claim 1, further comprising
  terminating the distal chain end to form an ethylenically unsaturated group.

10. The process as claimed in claim 9, wherein the terminating comprises
  reacting the distal end with a trialkylallylsilane compound or a conjugated diene,
  thermally treating or
  treating with a base.

11. The process as claimed in claim 1, wherein said reacting is stopped by addition of a protic compound.

12. The process as claimed in claim 1, further comprising reacting the living isobutene polymer with a coupling agent, to obtain two or more isobutene polymer chains connected to one another via their distal end.

13. The process as claimed in claim 12, wherein the coupling agent is at least one selected from the group consisting of i) compounds having at least two 5-membered heterocycles comprising a heteroatom selected from the group consisting of oxygen, sulfur and nitrogen, ii) compounds having at least two trialkylsilyl groups in allylic positions, and iii) compounds having at least two vinylidene groups conjugated to in each case two aromatic rings.

14. An isobutene polymer terminated at at least one end of the molecule by a group of the formula II

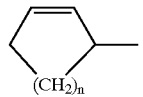
(II)

or a functionalization product thereof, obtainable by
i) hydrosilylation,
ii) hydrosulfurization,
iii) electrophilic substitution on aromatics,
iv) epoxidation and, optionally, reaction with nucleophiles,
v) hydroboration and, optionally, oxidative cleavage,
vi) reaction with an enophile in an ene reaction,
vii) addition of halogens or hydrogen halides or
viii) hydroformylation,
wherein n is 1, 2 or 3.

* * * * *